United States Patent [19]
Huber

[11] Patent Number: 6,152,541
[45] Date of Patent: Nov. 28, 2000

[54] QUICK RELEASE BICYCLE AXLE WITH THEFT-DETERRENT LOCKING END CAP

[76] Inventor: Lamont C. Huber, 907 5th Ave. #E, New York, N.Y. 10021

[21] Appl. No.: 09/185,195

[22] Filed: Nov. 4, 1998

Related U.S. Application Data

[63] Continuation-in-part of application No. 08/741,712, Oct. 31, 1996, abandoned.

[51] Int. Cl.[7] ................................................ E05B 71/00
[52] U.S. Cl. .......................................... 301/124.2; 70/233
[58] Field of Search ................................ 301/111, 124.1, 301/124.2, 120, 121; 70/225, 233

[56] References Cited

U.S. PATENT DOCUMENTS

| | | | |
|---|---|---|---|
| 4,392,690 | 7/1983 | Anderson | 301/121 |
| 4,679,862 | 7/1987 | Luo | 301/124.2 X |
| 4,770,011 | 9/1988 | Constant | 301/124.2 |
| 4,964,287 | 10/1990 | Gaul | 70/233 |
| 5,339,660 | 8/1994 | Fell | 301/124.2 X |

FOREIGN PATENT DOCUMENTS

| | | | |
|---|---|---|---|
| 15004 | 6/1913 | United Kingdom | 301/124.2 |
| 1141067 | 1/1969 | United Kingdom | 301/121 |

*Primary Examiner*—Russell D. Stormer
*Attorney, Agent, or Firm*—Rothwell, Figg, Ernst & Manbeck, P.C.

[57] ABSTRACT

A theft-deterrent, quick-release axle features a removable end cap assembly that is locked directly to the axle. A lock assembly disposed in the end cap assembly controls a latch member, e.g., a pin, which engages the axle directly. The end cap assembly also features an indicator member, e.g., an indicator pin, which provides an audible/tactile indication when the axle is properly positioned to have the end cap assembly locked to it. In a second embodiment of a theft-deterrent, quick-release axle according the invention, the end cap assembly includes a retention cylinder which is screwed onto a threaded end of the bicycle axle and secured thereto using, e.g., set screws, and a lock ring which screws onto and over the retention cylinder. The lock ring, which covers the set screws to prevent access thereto, is secured to the retention cylinder using, e.g., a push-button lock.

20 Claims, 4 Drawing Sheets

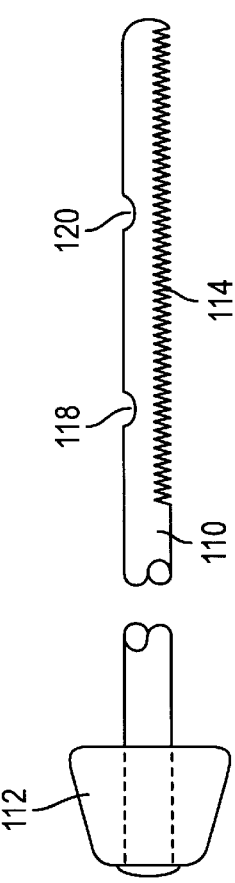
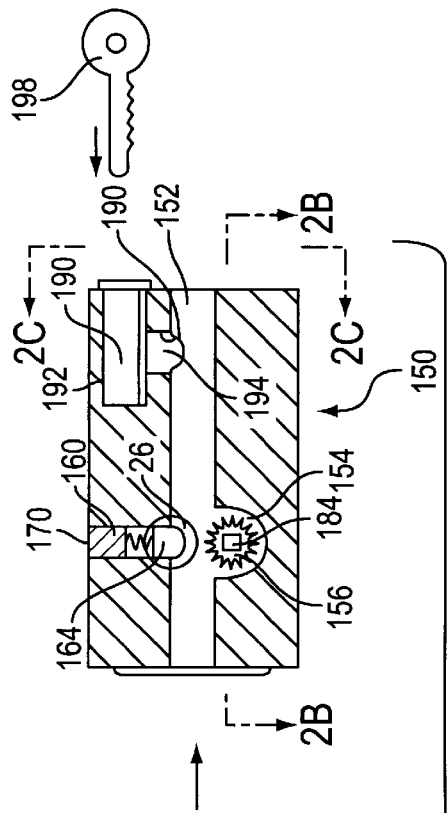
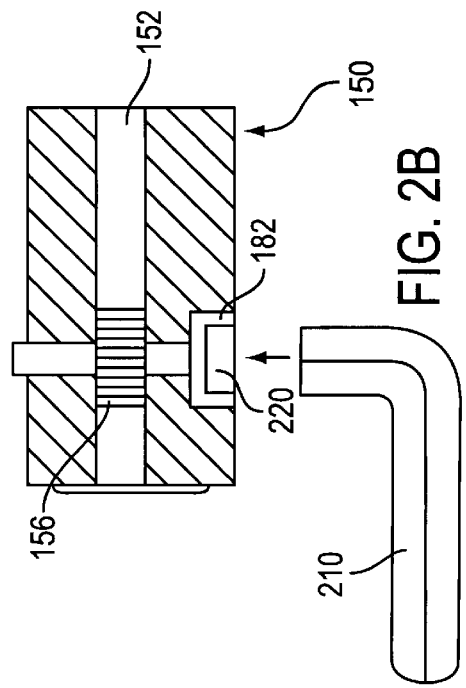
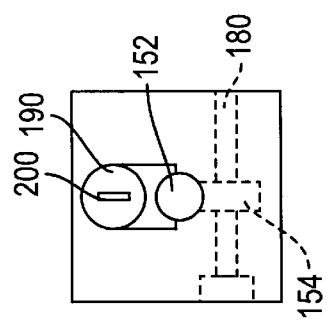
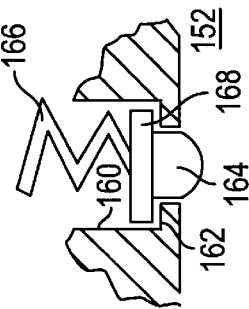
FIG. 2A
FIG. 2B
FIG. 2C
FIG. 2D

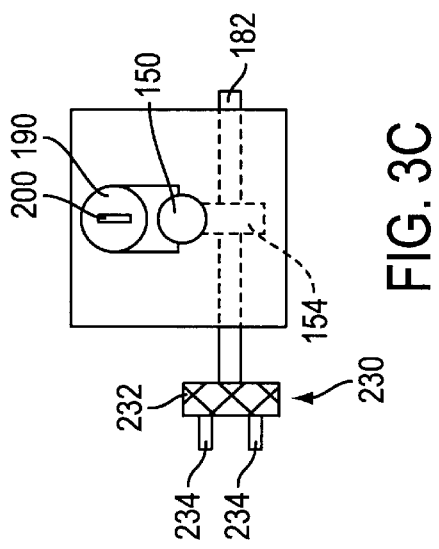
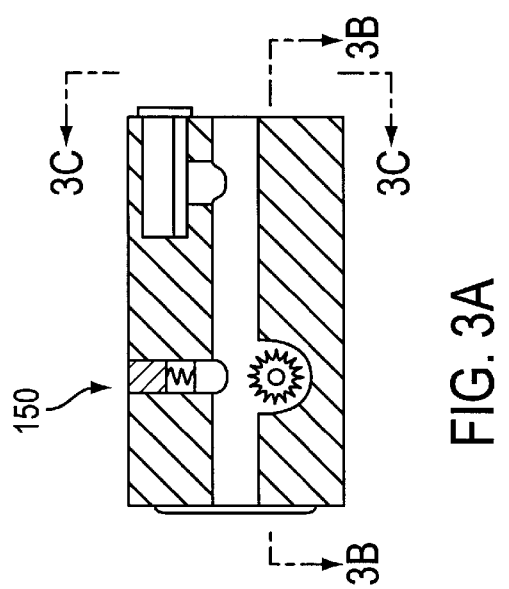
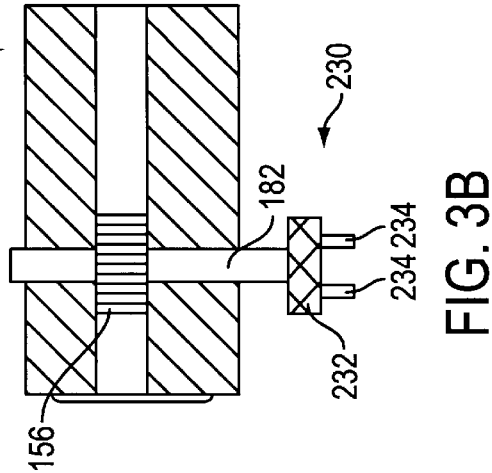

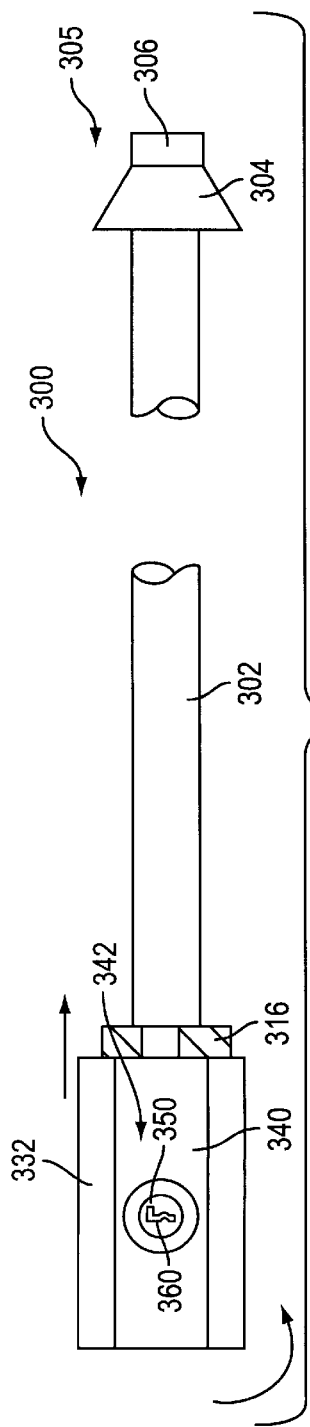
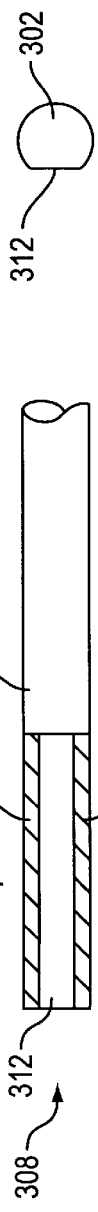
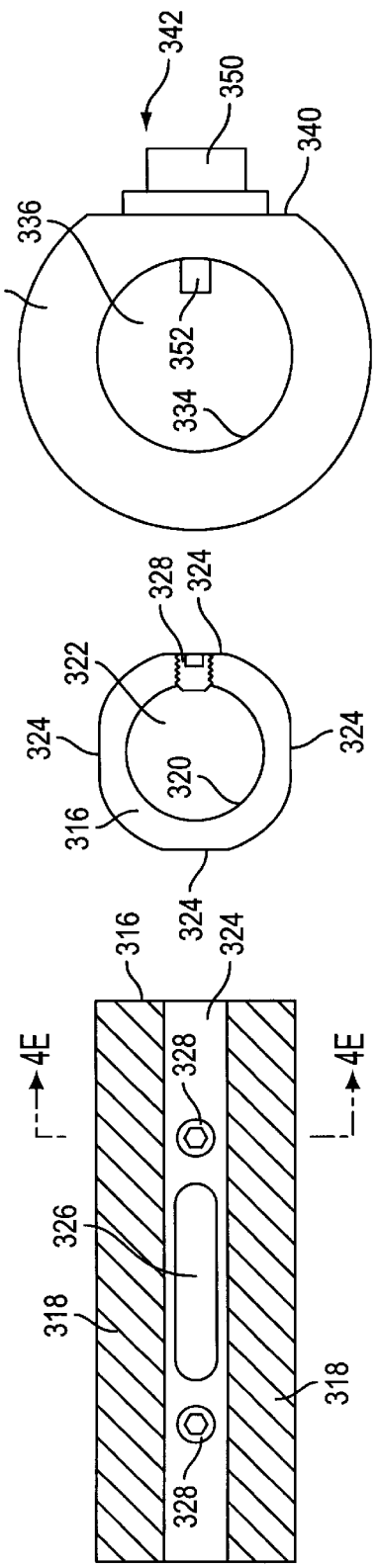
FIG. 4A FIG. 4B FIG. 4C FIG. 4D FIG. 4E FIG. 4F

QUICK RELEASE BICYCLE AXLE WITH THEFT-DETERRENT LOCKING END CAP

This application is a continuation-in-part of application Ser. No. 08/741,712 filed Oct. 31, 1996 now abandoned and having the same inventor as the present application.

BACKGROUND OF THE INVENTION

In general, the invention relates to quick-release bicycle axles which allow a bicycle wheel to be removed quickly and easily and, in particular, to quick-release bicycle axles which are configured to deter theft.

Quick-release bicycle axles are well known in the art. In general, as shown in FIG. 1, a quick-release axle 10 supports a hub H for rotation about the axle 10. Spokes (not shown) extend from the hub H to the rim of the wheel and support the wheel, as is generally known. The axle 10 is threaded at one end 12 and an end cap 14 is threaded onto the threaded end 12.

A quick-release cam mechanism is provided at the opposite end of the axle 10. Although a number of different configurations are known in the art, previously known quick-release axles tend to operate on the same general principle. Specifically, locking lever 18 is used to rotate a shaft 20 which passes through an aperture in the end of the axle 10, which is enclosed within end cap 22. The shaft 20 has a cam surface such that rotating the locking lever 18 and hence the shaft 20 "pulls" the axle 10 further into end cap 22. This causes the inner surfaces 24 and 26 of the end caps 14 and 22, respectively, to bear against the supporting tangs 28 of the bicycle fork and squeeze the tangs together slightly to secure the wheel to the fork. (Bearing elements (not shown) disposed between the ends of the hub H and the fork tangs 28 permit the hub to rotate about the axle 10.)

Because quick-release axles are so easily and quickly removed, a number of theft-deterrent mechanisms have been developed and are known in the art. Known theft-deterrent mechanisms all generally work by preventing the cammed actuator from being turned —either by limiting the range of motion of the locking lever 18 or by removably positioning a pin or other blocking means in the shaft 20 to prevent rotation —or by preventing access of the locking lever or an equivalent device to the shaft 20.

SUMMARY OF THE INVENTION

The present invention, in contrast, deters theft by permanently affixing one of the end caps to the axle and by locking the other end cap directly to the axle. This arrangement greatly simplifies construction of the locking mechanism and is generally more difficult to circumvent than prior art locking mechanisms.

Thus, in a general aspect, the invention features a theft-deterrent, quick-release bicycle axle assembly which includes an axle; a first, removable end cap assembly which is disposable on one end of the axle; and a second end cap assembly which is disposed at the second end of the axle. The removable end cap assembly includes an end cap body; a bore extending through the end cap body and configured to receive the first end of the axle; and a lock assembly disposed in the end cap body. A latch member, e.g., a lock pin, is also disposed within the end cap body and protrudes into the main bore. The latch member is either locked in place or released so as to retract from the longitudinal bore by means of the lock assembly. The removable end cap also includes means to draw the axle into the longitudinal bore. With this configuration, the removable end cap per se is locked directly to the end of the axle. This provides greater security, smaller size, easier assembly, and a more aesthetic appearance.

Embodiments of the invention may include one or more of the following features. The end cap may have a pinion gear which works with a rack gear on the axle to draw the axle into the end cap. The pinion gear may be caused to rotate by rotation of a shaft, and the shaft may have a socket to receive an Allen wrench-type tool or, alternatively, the shaft may have a thumb wheel such that it may be turned without tools.

The removable end cap may also have an indicator pin which clicks into a corresponding groove in the side of the axle to indicate when the axle has been pulled into the end cap assembly by a particular distance. Preferably, the indicator pin clicks into position at the same time the latch-receiving portion of the axle is in position to be secured by the latch member.

In another, preferred embodiment of the invention, the end cap body is formed from a pair of sleeves, one of which fits over the end of the axle and the other of which fits over the first one. A latch member, e.g. set screws, secures the first sleeve to the end of the axle, and the second sleeve prevents access to the latch member when it is positioned over and secured to the first sleeve. In this embodiment, the lock assembly preferably is disposed within the second sleeve and is used to secure the second, outer sleeve to the first sleeve, thereby preventing access to the latch member. Preferably, the lock is a push button lock that is key-actuated. With this embodiment, construction and use are even further simplified.

DESCRIPTION OF THE DRAWINGS

The invention will now be described in greater detail with reference to the following drawings in which:

FIGS. 2, 2A, and 2B are a schematic view partially in section, a section view along the lines 2A—2A in FIG. 2, and an end view, respectively, of one embodiment of a quick-release axle with locking end cap according to the invention; FIG. 2C is a detail view, partially in section, of the circled portion in FIG. 2; and FIGS. 3, 3A, and 3B are a schematic view partially in section, a section view along the lines 3A—3A in FIG. 3, and an end view, respectively, of an alternative configuration of the locking end cap of the embodiment of a theft-deterrent, quick-release axle as shown in FIGS. 2, 2A, and 2B.

FIG. 4 is a schematic, side view of a second embodiment of a quick-release axle with locking end cap according to the invention; FIG. 4A is a detail view of the end of the axle not visible in FIG. 4; FIG. 4B is a section view taken along the lines 4B—4B in FIG. 4A; FIG. 4C is a detail view of the retention cylinder which is partially visible in FIG. 4; FIG. 4D is a section view taken along the lines 4D—4D in FIG. 4C; and FIG. 4E is an end view of the lock ring shown in FIG. 4.

FIG. 5 and 5A are schematic views, partially in section, of another configuration of the embodiment shown in FIGS. 4–4E.

DETAILED DESCRIPTION OF THE INVENTION

Figure 1:
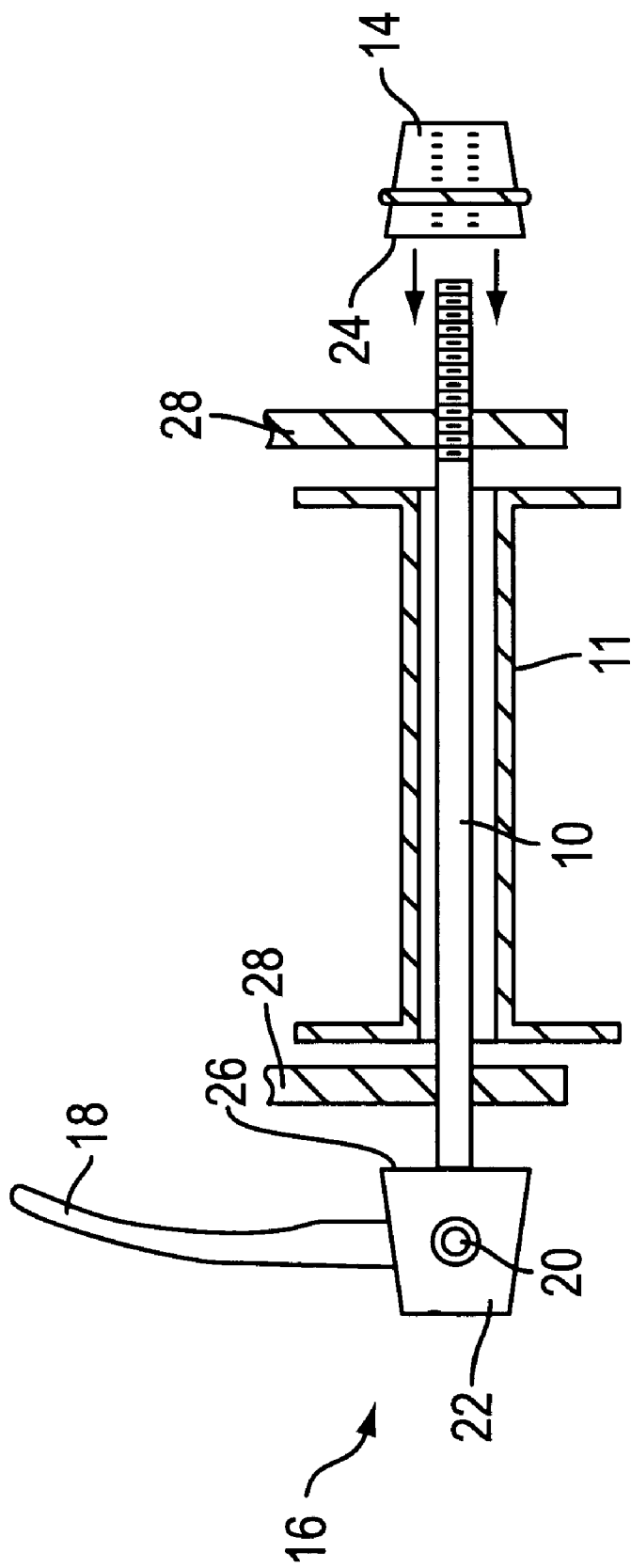
FIG. 1 is a side view, partially in section, showing a quick-release axle as known in the art.

As shown in FIGS. 2, 2A, and 2B, a first embodiment of a quick-release axle with locking end cap according to the invention includes an axle 110 and a locking end cap 150. The axle 110 has an end cap 112 which is permanently joined to one end of the axle and a series of teeth which form a rack gear 114 at the opposite end of the axle. The end cap 112 may be formed as an integral part of the axle or, as shown, may be press fit on the end of the axle and permanently secured thereto, e.g., by welding. The axle 110 also has a groove 118 and a latch receiving portion such as groove 120 which are used to position and then secure, respectively, the axle relative to the locking end cap 150, as explained below.

The locking end cap 150 is fashioned from a solid block of metal, e.g., aluminum, and has a longitudinal bore 152 extending through it. A bore recess 154 is formed in one wall of the bore 152, and a pinion gear 156 is disposed in the bore recess such that the teeth of the pinion gear extend into the bore 152.

A counterbore 160 extends into the side of the end cap and extends to the main, longitudinal bore 152 while leaving a retaining shoulder 162 as shown in greater detail in FIG. 2C. A position indicator pin 164 is disposed in the counterbore 160 and is biased by spring 166 to protrude into the main longitudinal bore 152. The indicator pin 164 is restrained by shoulder 168 which abuts retaining shoulder 162 of the counterbore 160. A plug 170 is inserted into the counterbore 160 behind the spring 166 and is permanently secured in place.

The locking end cap 150 has another bore 180 which passes all the way through it and, in particular, through the bore recess 154. A pinion gear shaft 182 passes through the counterbore 180 and through a correspondingly shaped aperture 184 in the pinion gear. A spring clip or E-clip (not shown) is secured to the end of the pinion gear shaft to prevent the pinion gear shaft from being withdrawn from the bore 180.

The locking end cap has a plug-type lock 190, e.g., a "church lock," press fit into another bore 192 that is sunk into the end of the end cap. A latch member such as lock pin 194 slides within bore 196 extending between the bore 192 and the main longitudinal bore 152. When key 198 is inserted into slot 200 and turned to unlock the plug-type lock 190, then lock pin 194 is free to rise within the bore 196 such that its lowermost end no longer protrudes into the longitudinal bore 152. The lock pin 194 has a configuration similar to that of the position indicator pin 164 to restrain it within the bore 196 (see FIG. 2C).

The quick-release axle and locking end cap work as follows. A bicycle wheel with a quick-release, theft-deterrent axle according to the invention is mounted to the supporting fork assembly in the same general manner as shown in FIG. 1. The locking end cap 150 is then inserted onto the end of the axle 110 with the bore 152 sliding over the axle. When the pinion gear 156 contacts the end of the axle, Allen wrench 210 is inserted into socket 220 in the end of pinion gear shaft 182 and is used to turn the pinion gear 156 clockwise, as shown in FIG. 2. This draws the axle 110 further into the bore 152 and hence clamps the tangs of the bicycle fork between the two end caps 112 and 150. (The lock 190 must be unlocked during this operation such that the lock pin 194 is free to rise within the bore 196 as the end of the axle 110 contacts the lock pin and passes by it.)

When the axle 110 has been drawn into the bore 152 by the proper amount, position indicator pin 164 will click into groove 118, and this clicking can be both felt and heard. Furthermore, lock pin 194 will be engaging groove 120. At this point, the lock 190 is locked using key 198 such that the lock pin 194 is no longer free to rise within the bore 196. Hence, the end cap 150 is securely locked directly to the end of the axle 110, thereby preventing its removal and theft of the wheel.

An alternative configuration of the locking end cap assembly is shown in FIGS. 3A and 3B. In this configuration, the pinion gear shaft 182 is provided with a thumbwheel 230 instead of the Allen wrench-receiving socket 220. The thumbwheel has a knurled surface 232 which provides a good grip, as well as thumb extensions 234 which may be grasped between the thumb and forefinger to turn the pinion gear shaft 182. The end cap configuration shown in FIGS. 3A and 3B is otherwise identical to that shown in FIGS. 2–2C.

A second embodiment of a quick-release bicycle axle with a theft-deterrent locking end cap, which operates on generally the same basic principles as the embodiment described above, is shown in FIGS. 4–4E. In this embodiment 300, the axle 302 has a fixed end cap 304 at one end 305 thereof. The fixed end cap 304 is either integrally formed with the axle 302 or permanently fixed thereto in any convenient fashion. The fixed end cap 304 has a square or hex-shaped lug extension 306, which is used to tighten the axle as explained below. The fixed end cap 304 alternatively may have just a hexagonal socket which receives an Allen-type hex-wrench, or the lug extension 306 may have such a socket.

As shown in FIGS. 4A and 4B, the opposite end 308 of the axle 302 is externally threaded along a portion thereof, as indicated schematically by cross-hatching 310. As shown in FIG. 4B, the externally threaded portion has a flat 312 formed therealong, e.g. by milling the axle 302 before the end 308 has the threads formed on it.

As shown in FIG. 4, a retention cylinder 316 is screwed onto the externally threaded end 308 of the axle 302. Details of the retention cylinder 316 are shown in FIGS. 4C and 4D. As indicated schematically by cross-hatching 318, the external surface of the retention cylinder 316 is threaded, as is the interior surface 320 of the bore 322 extending through the retention cylinder 316.

The retention cylinder 316 has four flats 324 formed thereon which are devoid of threads. The flats 324 may be formed, e.g., by milling the external surface of the retention cylinder 316 before the threads are formed thereon. Each of the flats 324 has a latch-receiving, groove-shaped "trough" or "valley" 326 formed therein, e.g. by milling, which extends approximately half-way through the wall of the retention cylinder. Additionally, screw holes extend from at least one of the flats 324 through the wall of the retention cylinder and into the bore 322, and a latch member such as set screws 328 are provided therein.

As further shown in FIG. 4, lock ring 332 screws onto the retention cylinder 316. Interior surface 334 of the lock ring bore 336 (FIG. 4E) is threaded to mate with the threaded exterior surface of the retention cylinder 316.

The lock ring 332 has a flat 340 formed on one side thereof. A key-release, push-button-type lock assembly 342, e.g. model number MPL 201 available from the Royal Lock Corporation in Wauconda, Ill., is screwed into a threaded lock assembly-receiving bore (not shown) extending from the flat 340 through the wall of the lock ring to the bore 336. The lock assembly 342 is secured in place by a pin (not shown) which is tapped into a small hole (not shown) in the side of the lock ring 332 and which extends into a pin-receiving slot or hole in the lock assembly. The pin is secured in the lock ring by means of an interference or friction fit.

In operation, the wheel of a bicycle (e.g., the front wheel) is mounted on and secured to the fork of the bicycle as follows. The threaded end 308 of the axle 302 (without the retention cylinder or lock ring) is passed through the hub of the wheel, and the axle is positioned in the tangs of the fork with the fixed end cap 304 located on the outside of one of the tangs and the threaded end 308 of the axle extending through and beyond the opposite fork tang. (For proper positioning, it may be desirable to put one or more washer-shaped spacer shims over the axle 302, before it is inserted through the hub, so that the spacers are positioned between the fork tang and the fixed end cap 304.) The retention cylinder 316 is then screwed onto the threaded end 308 of the axle 302, with the threaded end of the axle extending into the bore 322 of the retention cylinder 316. The retention cylinder is turned by hand, grasping the fixed end cap 304 with the opposite hand, until it "snugs up against" the fork tang. It is then rotated either slightly further, if possible, or backward until the set screws 328 are positioned over the flat 312 on the threaded end 308 of the axle 302. At this point, the set screws are tightened down, e.g. using an Allen-type hex wrench.

The lock ring 332 is then screwed onto and over the retention cylinder 316, as indicated in FIG. 4. The lock ring 332 is turned by hand until it butts up against the fork tank. At this point, the lock ring is screwed down onto the retention cylinder more tightly by grasping the lug extension 306 with a wrench (or inserting the end of a hex wrench into a socket, if provided) and continuing to turn the lock ring by hand.

While turning the lock ring, button 350 of the lock assembly 342 is continuously pressed lightly to cause the retractable lock latch 352 (shown as extended) to be pressed toward the interior of the lock ring, i.e., against the surface of the retention cylinder. When the lock ring is rotated to a position such that the latch 352 is located over one of the troughs or valleys 326, the lock latch 352 will extend down into the valley. At this point, the button will remain depressed with the lock latch 352 extending into the valley 326, thereby securing the lock ring to the retention cylinder. Because the lock ring completely covers the set screws 328, which secure the retention cylinder to the threaded end 308 of the axle, the entire assembly is at this point secured to the axle.

The assembly subsequently may be removed by unlocking the lock assembly 342. A key (not shown) is inserted into key slot 360 (FIG. 4) in the top surface of the button 350 and is rotated. At this point, the button pops back up, withdrawing the latch 352 from the valley 326 and allowing the lock ring to be unscrewed from the retention cylinder. This exposes the set screws 328 so that they may be loosened and so that the retention cylinder can be removed from the axle.

Other embodiments, configurations, and uses will occur to those having skill in the art. For example, the inventive concepts disclosed herein may be employed in a locking, quick-release seat post clamp. Such modifications and uses are deemed to be within the scope of the following claims.

What is claimed is:

1. A theft-deterring, quick-release bicycle axle apparatus, said apparatus comprising:
    an axle having first and second ends and a latch-receiving portion located near said first end;
    a first, removable end cap disposable on the first end of said axle, said removable end cap comprising
        an end cap body,
        a bore extending into said end cap body to receive the first end of said axle,
        a lock assembly disposed within said end cap body,
        a latch member disposed within said end cap body and configured to extend into said bore to make locking engagement with the latch-receiving portion of said axle, said latch member being secured in a position extending into said bore so as to make said locking engagement with the latch-receiving portion of the axle and said latch member being permitted to retract from said bore as said lock assembly is locked and unlocked, respectively, whereby said first end cap is locked to and unlocked from the first end of said axle as said lock assembly is locked and unlocked, respectively, and
        means for drawing said axle into said bore; and
    a second end cap disposed at the second end of said axle.

2. The apparatus of claim 1, wherein said axle has a rack gear disposed along a surface thereof and wherein said means for drawing said axle into said bore comprises a pinion gear configured to mate with said rack gear, said pinion gear being disposed within said end cap body in a manner to protrude at least partially into said bore such that said pinion gear engages said rack gear.

3. The apparatus of claim 2, further comprising a pinion gear shaft, wherein rotation of said pinion gear shaft causes rotation of said pinion gear.

4. The apparatus of claim 3, wherein said pinion gear shaft has a socket which is accessible from the exterior of said end cap body and which is configured to receive an Allen wrench-type tool.

5. The apparatus of claim 3, wherein said pinion gear shaft has a thumb wheel disposed at an end thereof and exterior to said end cap body.

6. The apparatus of claim 1, wherein said axle has an indicator portion and said first end cap further comprises an indicator member which indicates when said indicator portion is disposed adjacent to said indicator member.

7. The apparatus of claim 6, wherein said indicator member is spaced from said latch member by a first distance and said indicator portion is spaced from said latch-receiving portion by a second distance which is generally the same as said first distance, whereby said indicator member indicates proximity of said indicator portion when said latch-receiving portion is positioned to receive said latch.

8. The apparatus of claim 6, wherein said indicator member is spaced from said latch member by a first distance and said indicator portion is spaced from said latch-receiving portion by a second distance which is generally the same as said first distance, whereby said indicator member indicates proximity of said indicator portion when said latch-receiving portion is positioned to receive said latch.

9. The apparatus of claim 8, wherein said indicator pin is biased to protrude into said bore such that said indicator pin clicks into engagement with said groove when said axle is positioned with said groove adjacent said indicator pin.

10. The apparatus of claim 1, wherein said second end cap is permanently affixed to the second end of said axle.

11. The axle assembly of claim 1, wherein said end cap body comprises first and second mating sleeves, said bore extending into said first sleeve such that said first sleeve fits over the first end of the axle, said second sleeve fitting over said first sleeve.

12. The axle assembly of claim 11, wherein said latch member comprises one or more pin members extending through the body of said first sleeve and into said bore to engage the latch-receiving portion of said axle, said one or more pin members each being inaccessible and thereby fixed in position when said second sleeve is disposed over and secured to said first sleeve, and said one or more pin members each being accessible and thereby retractable when said second sleeve is not disposed over said first sleeve.

13. The axle assembly of claim 12, wherein the latch-receiving portion of said axle comprises a flat surface formed on said first end and said one or more pin members comprise one or more set screws which bear against said flat surface.

14. The axle assembly of claim 12, wherein said lock assembly is disposed within said second sleeve, said lock assembly and said first and second sleeves being configured such that said second sleeve can be secured to said first sleeve when said lock assembly is locked, thereby preventing access to and retraction of said one or more pin members, and said second sleeve can be removed from said first sleeve when said lock assembly is unlocked, thereby permitting removal of said second sleeve from said first sleeve, access to and retraction of said one or more pin members from said bore, and removal of said first sleeve from the first end of said axle.

15. The axle assembly of claim 14, wherein said first cylinder has one or more trough-shaped valleys or depressions formed in an exterior surface thereof, said lock assembly cooperating with said valleys or depressions to secure said second sleeve to said first sleeve.

16. The axle assembly of claim 14, wherein said lock assembly comprises a push-button lock.

17. The axle assembly of claim 16, wherein said push-button lock is key-actuated.

18. The axle assembly of claim 11, further comprising means for drawing the first end of said axle into said bore.

19. The axle assembly of claim 18, wherein the first end of said axle is externally threaded and said bore is internally threaded, said means for drawing the first end of said axle into said bore comprising the threads on the first end of said axle and in said bore.

20. A theft-deterrent, quick-release bicycle axle assembly, said axle assembly comprising:

an axle having first and second ends;

a first end cap assembly removably disposed on said first end, said first end cap assembly comprising a retention cylinder disposed over said first end and a lock ring disposed over said retention cylinder, said retention cylinder having a latch member and being selectively securable to said first end by means of said latch member, said lock ring having a lock assembly and being selectively lockable to said retention cylinder by means of said lock assembly so as to be immovable with respect to said retention cylinder, whereby said lock ring prevents access to said latch member when disposed over and locked to said retention ring, thereby preventing removal of said end cap assembly from said first end; and a second end cap at the second end of said axle.

* * * * *